United States Patent [19]
Nickels

[11] Patent Number: 6,158,775
[45] Date of Patent: Dec. 12, 2000

[54] MUD FLAP LIFTING SYSTEM

[76] Inventor: Dean R. Nickels, 11-429 Road J, Malinta, Ohio 43535

[21] Appl. No.: 09/047,833

[22] Filed: Mar. 25, 1998

Related U.S. Application Data

[63] Continuation-in-part of application No. 08/601,301, Feb. 16, 1996, abandoned.

[51] Int. Cl.[7] .......................... B62D 25/16; B62D 25/18
[52] U.S. Cl. .......................... 280/847; 280/851; 280/154
[58] Field of Search .................................... 280/154, 851, 280/847; 293/118

[56] References Cited

U.S. PATENT DOCUMENTS

| | | | |
|---|---|---|---|
| 3,248,126 | 4/1966 | Saxton et al. | 280/851 |
| 3,582,109 | 6/1971 | Moore | 280/851 |
| 4,097,090 | 6/1978 | Payne et al. | 280/154.5 |
| 5,582,431 | 12/1996 | Anderson | 280/851 |
| 5,600,096 | 2/1997 | Cherry et al. | 174/84 |
| 5,833,254 | 11/1998 | Bucho | 280/154 |

*Primary Examiner*—Michael Mar
*Assistant Examiner*—Hau Phan
*Attorney, Agent, or Firm*—Marshall & Melhorn

[57] ABSTRACT

A mud flap lifting device is provided for mounting on a truck or other vehicle in which the device selectively lifts the mud flap away from the tires. A cable has a first end fixedly secured relative to the vehicle and a second end fixedly secured to the mud flap near the lower edge thereof. A power cylinder is mounted to the vehicle in proximity to an upper edge of the mud flap, the cylinder including a movable piston. This piston engages the cable at a location intermediate the first and second ends thereof. In this manner, movement of the piston displaces the cable in a direction generally transverse to the longitudinal axis of the cable, thereby moving the mud flap between a fully extended position and a raised position. The existing pneumatic power system of the vehicle may be used and the controls can be mounted in a truck cab to facilitate operation of the device to lift the mud flaps.

7 Claims, 6 Drawing Sheets

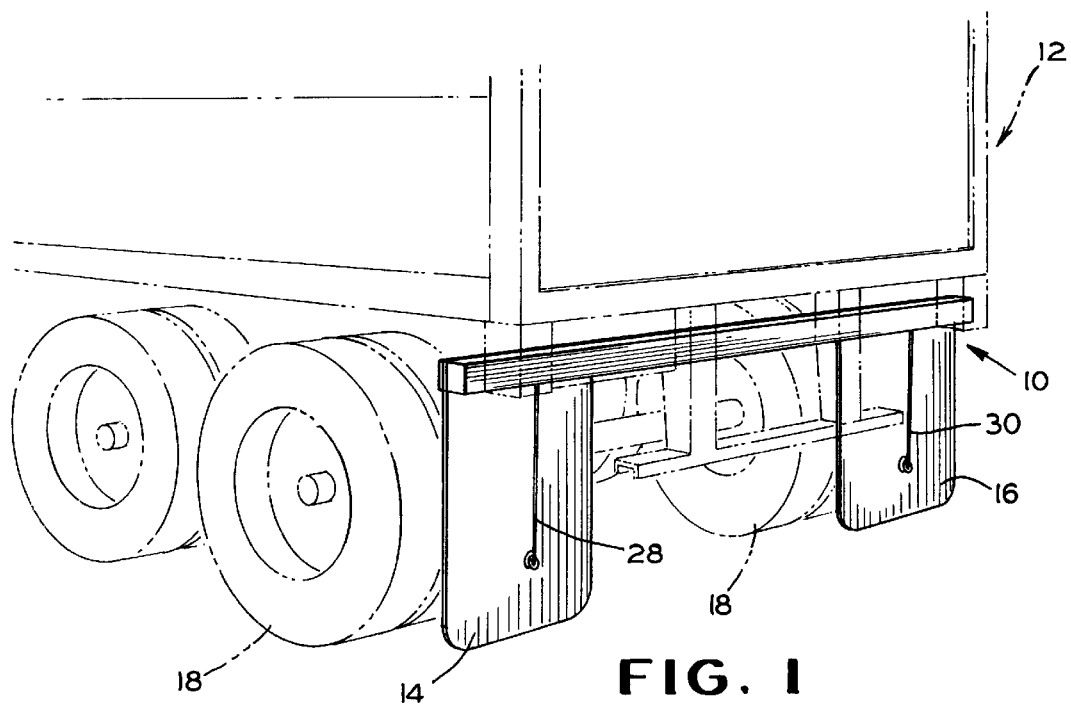
FIG. 1
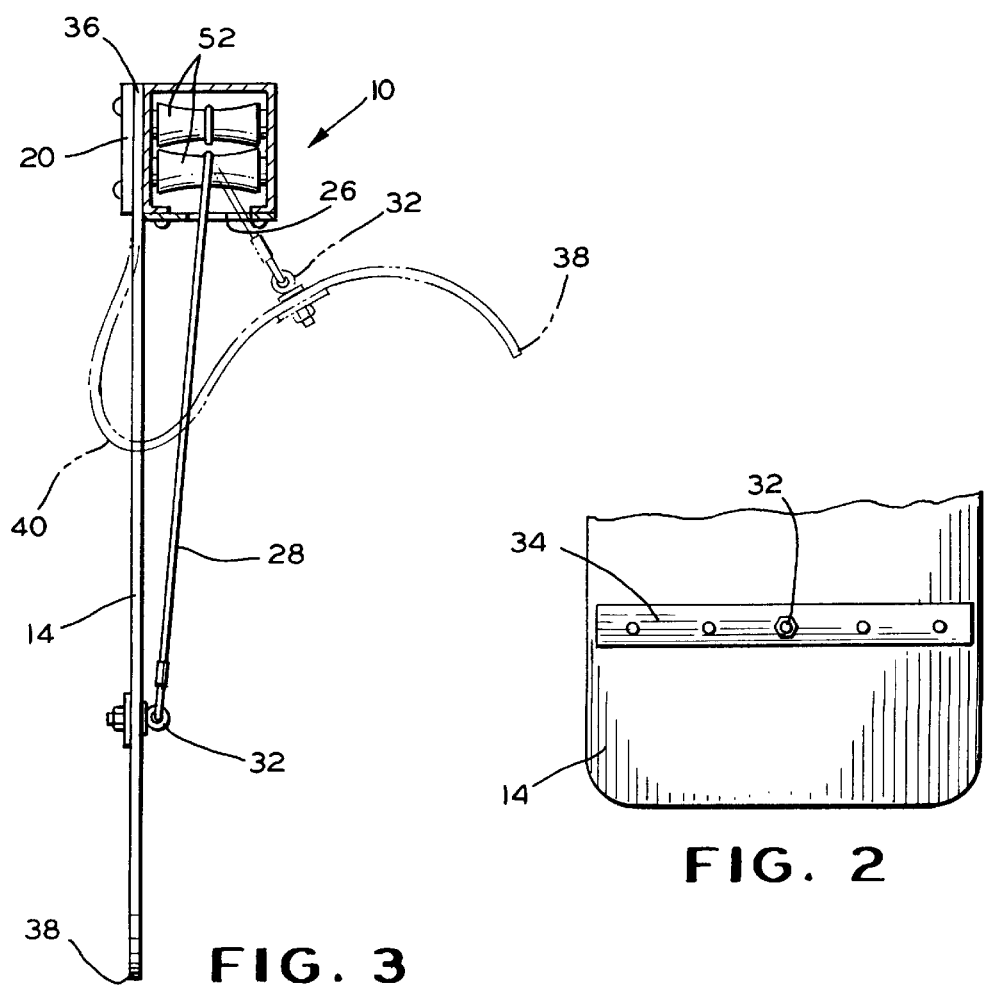
FIG. 2
FIG. 3

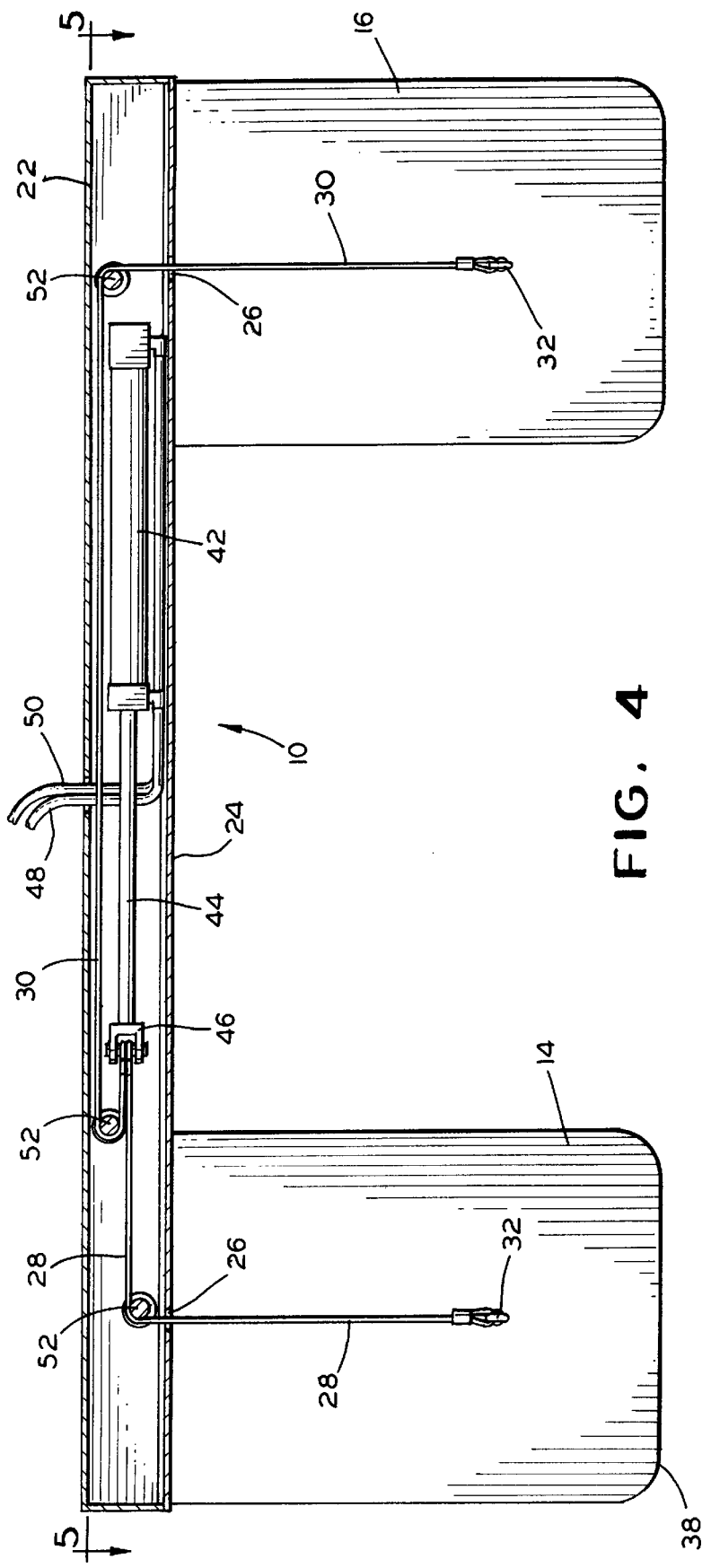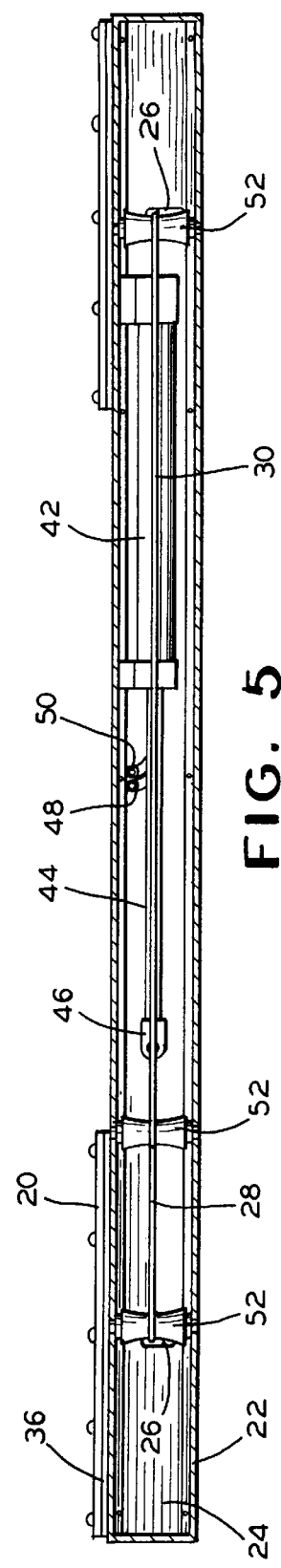

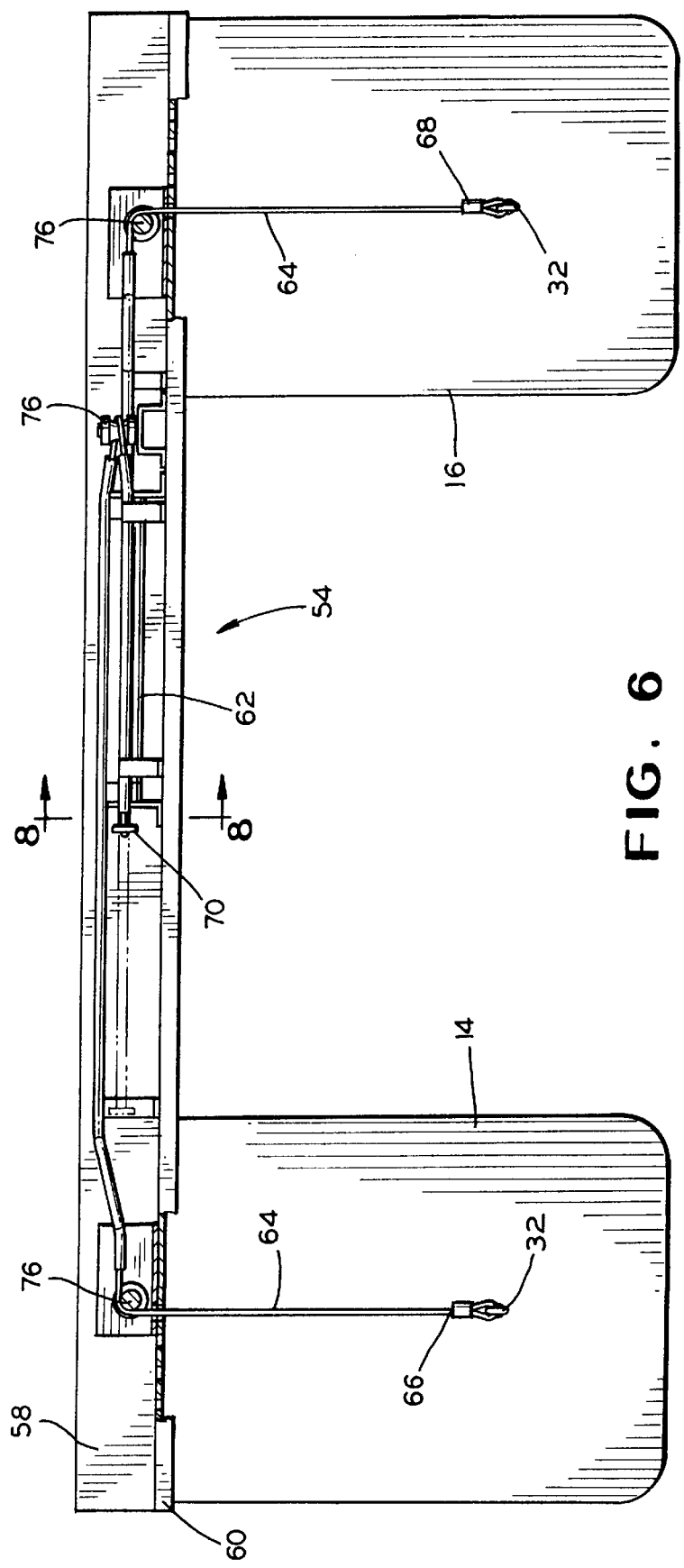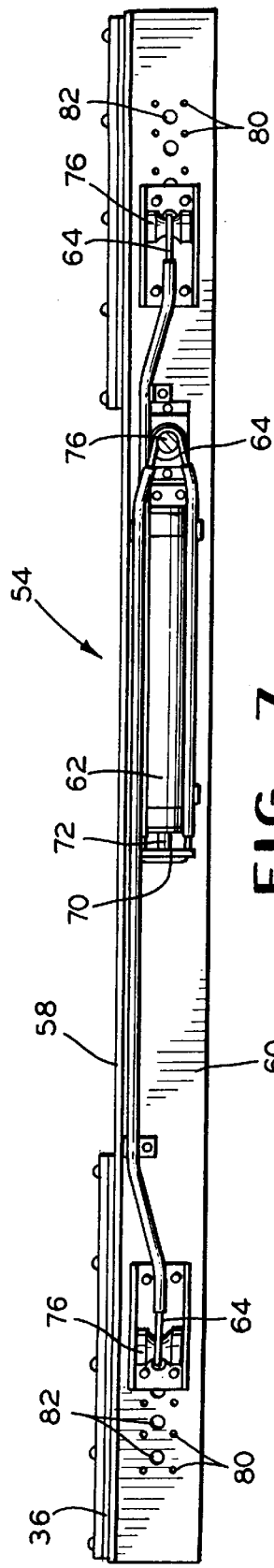
FIG. 6
FIG. 7

MUD FLAP LIFTING SYSTEM

RELATED APPLICATION

This application is a continuation-in-part of application Ser. No. 08/601,301 filed Feb. 16, 1996 now abandoned, which is hereby incorporated by reference in its entirety.

BACKGROUND OF THE INVENTION

The present invention relates to a system for lifting mud flaps into a raised position away from the surface of the truck tires, and in particular, to a pneumatic power system for raising the mud flaps of a truck when the truck is backing up in order to prevent damage to the mud flaps.

Mud flaps are mounted on trucks and trailers to prevent the tires of such vehicles from spraying water, mud and other road debris. The mud flaps also prevent damage to the body of the truck or trailer caused by stones and similar hard objects. One of the primary benefits of mud flaps is to prevent the water spray and debris discharge onto the vehicles in proximity to such truck or trailer as the vehicles travel down the road.

A majority of states have statutes or regulations which require trucks and trailers to be furnished with mud flaps. The spacing between the bottom edge of the mud flap and the ground and the spacing between the inner surface of the mud flap and the vehicle tires are typically regulated by the states. The fines and other penalties for operating a vehicle without proper mud flaps are a nuisance and can be a significant expense and legal risk for repeat violations.

Vehicles which require mud flaps, such as trucks and trailers, frequently have mud flaps torn from their mounting brackets during normal operation of the vehicle. The majority of the mud flaps are torn off when the vehicle is backing up or when dumping a load at the back of the vehicle. Trucks used in construction and paving operations often lose a mud flap. In paving operations, a dump truck with a load of asphalt will back up to a paving machine and will dump its load while the paving machine is pushing the dump truck forward. The tires of the truck or the front of the paving machine will frequently catch the end of the mud flap and rip the flap right out of its bracket.

When trucks or trailers are backing up over rough terrain, such as stone, loose dirt, heavy snow/ice, curbs, or other similar obstacles, the mud flaps are often caught under the tires of the vehicle, which tears the mud flap right out of the mounting bracket. In some cases, the weight of the vehicle backing over the mud flap will pull the flap brackets, chrome, and other mounting devices, from the vehicle.

Owners and operators of vehicles which require mud flaps are frustrated by the time and expense required to replace mud flaps. The mud flaps themselves are not very expensive, but the lost operating time for the vehicle and the additional manpower expense required to install new mud flaps can become a significant operating expense.

In the prior art, U.S. Pat. No. 3,877,722 (Conner) shows a vertical center bar fastened to the mud flap. The mud flap is supported by the center bar in operation, but is detached from the center bar to permit the roll up of the mud flap when not in use. The center bar is pivoted to a parallel position with the frame.

U.S. Pat. No. 4,319,764 (Whitaker) describes the problems in the logging industry with damage to the mud flaps when backing up over rough terrain and obstacles. Whitaker approaches the problem by designing a special frame to hold the mud flaps in place relative to the wheel. The horizontal swing arms of the mounting frame are pivotably mounted to permit the arm to swing forward to minimize damage as the vehicle is backing up. A positive stop or blocking means is used to prevent the swing arms from swinging in a rearward direction, which permits normal use of the mud flap as the vehicle is traveling down the highway.

A two part mud flap with a lower screen which is pivotably mounted to the upper portion of the mud flap is disclosed in U.S. Pat. No. 4,362,310 (Goodall). The linkages mounted on the frame permit the lower screen to pivot in either direction when obstruction is encountered.

U.S. Pat. No. 4,964,655 (Tucker) provides a number of rubber discs connect together with metal segments that allow movement of the mud flap in only one direction. The rubber discs rotate on metal rods. The rubber discs rotate when on obstruction is encountered such that the rubber discs rotate to prevent the mud flap from snagging against a tire or other object.

U.S. Pat. No. 3,248,126 (Saxton et al.) and U.S. Pat. No. 3,582,109 (Moore) disclose relatively devices for raising the mud flaps of a dump truck having an underbody on which a power cylinder is mounted. In each case, the power cylinder is connected to a lever arm, which is in turn connected to a cable secured to the mud flaps. Each of these devices, however, is relatively complex, requires the vehicle to have a suitable underbody on which to secure the components, and leaves the components unprotected from the environment.

Owners and operators of vehicles with mud flaps have a need for a device which can reduce the likelihood of tearing off a mud flap when backing up the vehicle or when dumping a load. The device must be relatively inexpensive and be easy to install and operate on existing vehicles.

SUMMARY OF THE INVENTION

In accordance with a first embodiment of the present invention, there is provided a mud flap lifting system for mounting on a truck or other vehicle. The mud flap lifting device selectively lifts mud flaps away from the tires when the truck is backing up or dumping its load. The main components of a system for the two mud flaps at the rear of a truck or other vehicle include a pneumatic power system, a cable attached to each of the mud flaps, pulleys or other similar brackets for facilitating the wind-up and unwinding of the cable, and control switch to operate and control the pneumatic system. Hydraulic systems or other power systems available on a vehicle could be used to power the system.

Each mud flap has one end of the cable bolted or otherwise fastened near the bottom of the mud flap. The cable is extended vertically along the surface of the mud flap to a mounting bracket which is used to secure the mud flaps to the frame of the truck or trailer. A right angle pulley or other similar roller device is used to direct the cable in a horizontal direction to the piston of a power cylinder, such as a pneumatic cylinder, a hydraulic cylinder, or an electric solenoid. The mud flap may be moved between a straight, vertical position to a raised, folded position by extending and retracting the piston of the cylinder. In the raised position, the cable attached to the mud flap is pulled up such that the free end of the mud flap is lifted to avoid being caught under the tire. After the vehicle has completed its back up or has dumped its load, the piston is operated to return the mud flaps to their normal, open road, operating position.

A control switch is located in the cab of the truck to permit the truck driver to lift the mud flaps when backing up or unloading. A three position solenoid switch can be used to control the pneumatic or hydraulic power supply to the power cylinder for operation of the piston.

In an alternate, most preferred embodiment of the invention, a vehicle mud flap lifting device comprises a cable having a first end fixedly secured relative to the vehicle and a second end fixedly secured to a mud flap mounted on the vehicle in spaced apart relationship to a top edge thereof. A power cylinder appropriately connected to a power source is mounted on the vehicle in proximity to an upper edge of the mud flap. The power cylinder and a portion of the cable are preferably housed in a cover mounted to the vehicle. The power cylinder includes a movable piston, the piston engaging the cable at a location intermediate the first and second ends thereof. A roller or like low friction device for engaging the cable is preferably mounted on the end of the piston. Movement of the piston displaces the cable in a direction generally transverse to the longitudinal axis of the cable to thereby move the mud flap between a fully extended position and a raised position.

An object of the present invention is to provide a mud flap lifting system which minimizes or eliminates the destruction of mud flaps when a vehicle is backing up or dumping a load.

Another object of the present invention is to utilize a power source already provided by the vehicle for the mud flap lifting system. Trucks have a pneumatic power system which typically provides more than adequate power to operate the system.

A further object of the present invention is to provide a mud flap lifting system which is easy to install and maintain. The system must be compact so as to mount on the truck body or frame in proximity to the mud flaps.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 1 is a perspective view of the mud flap lifting system mounted on the back of a truck trailer;

FIG. 2 shows a mounting bolt and brace used to secure the cable of the lifting system to the mud flap;

FIG. 3 is a side elevational view of the mud flap lifting system showing the mud flap is an extended position and in a lifted position;

FIG. 4 is a front elevational view of the system with the cover removed to show the power cylinder, the channel guides, and the cable configuration;

FIG. 5 is a top plan view of the system taken along line 5—5 in FIG. 4;

FIG. 6 is a front elevational view of a second embodiment of a two mud flap system with rear mounting;

FIG. 7 is a top plan view of the system shown in FIG. 6;

DESCRIPTION OF THE PREFERRED EMBODIMENT

Figure 8:
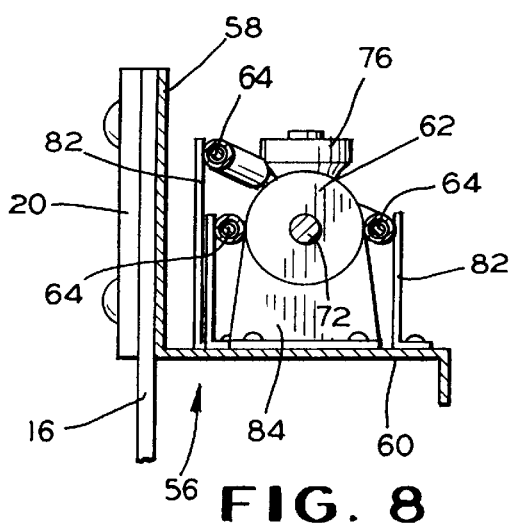
FIG. 8 is a cross sectional view of the system taken along lines 8—8 in FIG. 6.
Figure 9:
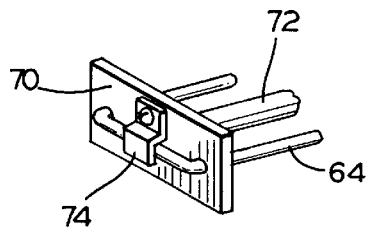
FIG. 9 is a mounting bracket for securing the cable at the head of the piston.

Referring now to the drawings, there is shown in FIGS. 1–5 a first embodiment of a mud flap lifting device 10 of the present invention mounted on the end of a truck trailer 12 at the top of the mud flaps 14 and 16. When the truck trailer 12 or any other vehicle with mud flaps, is backing up, any matter blocking the mud flaps 14, 16 will often cause the mud flaps 14, 16 to be pulled under the tires 18 and ripped from the bracket 20 used to mount the mud flaps 14, 16. When a mud flap 14, 16 is pulled off, the owner or operator of the vehicle has to incur the expense and time to replace the mud flap.

A number of different mounting brackets or frames are used to mount mud flaps depending on the type and design of the vehicle. The mud flaps 14, 16 in FIGS. 1–2 are shown mounted to a planar bracket 20. The housing 22 for the lifting device 10 may be mounted on the same bracket 20 or at any convenient location on the vehicle 12 in proximity to the upper edge of the mud flaps 14, 16.

Because of the dirty, outdoor environment encountered by the lifting device, a housing 22 is provided to enclose the main components of the lifting device 10. The housing 22 is an elongate, rectangular shaped enclosure which fits in the limited space available for mounting the device 10 and which provides adequate space for actuation of the pneumatic power cylinder as hereinafter described. The base 24 is provided with apertures 26 for positioning of the lifting cables 28, 30.

The cables 28, 30 may be secured to mud flaps 14, 16 by any suitable connector. FIGS. 2–3 show an eye bolt 32 with a support bracket 34 attached to the mud flap 14. The cables 28, 30 may be made of any flexible, high strength material, such as braided stainless steel cable. The point of connection can be made at any place along the length of the mud flaps 14, 16. However, a connecting point near the upper edge 36 will not provide sufficient lift to raise the lower edge 38 of the mud flap 14. Many mud flaps are made from a stiff rubber, or other stiff material, which makes bending the mud flap 14 a more difficult task. A connecting point near the lower edge 38 result in undesirable stresses at the top edge 36 which is secured to the frame 20 and at the fold area of the mud flap 14. A connecting point approximately of between 20%–50% of the length of the mud flap from the bottom edge 38 results in a rounded fold area 40 with an acceptable lifting height on both the fold area 40 and the lower edge 38.

As shown in FIGS. 4–5, a power cylinder 42 is mounted in housing 22 with the piston 44 fully extended. The power cylinder could include a pneumatic cylinder, a hydraulic cylinder, an electrical solenoid, or other similar power device. A head bracket 46 or other fastener is mounted at the head of the piston 44 to secure the cables 28, 30. The power cylinder 42 will typically be a pneumatic or a hydraulic cylinder. Power hoses 48, 50 connect the cylinder 42 to a pneumatic or hydraulic power supply on the vehicle. A control switch is mounted in a convenient location, such as the cab area of a truck, so that the driver of the vehicle can operate the power cylinder 42 in a known manner. The pneumatic power sources and hydraulic power sources on vehicles are typically set up to accommodate auxiliary devices such that the installation of the control switch, and the connection of the hoses 48 and 50 between the cylinder 42 and the power sources can be completed in a known manner.

The power cylinder 42 is generally mounted in a horizontal configuration with respect to the earth, and the piston 44 is actuated in a horizontal direction. Although the housing 22 and the cylinder may be mounted vertically on the frame of the vehicle, the mounting space limitations on most vehicles results in a horizontal mounting (parallel to the vehicle axles) at the top mud flaps 14, 16.

The piston 44 of the power cylinder 42 is actuated in a horizontal direction. The mud flaps 14, 16 are to be lifted in a vertical direction. The use of the cables 28, 30 and rollers 52 or other similar sheaves, are an effective and low cost method for transferring the action of the piston 44 to the mud flaps 14, 16. Although the housing 22 and the base 24 could be enlarged to accommodate two cylinders such that the mud flaps could be operated independently, the preferred configuration is to use a single cylinder to operate both mud flaps 14, 16.

Each of the mud flaps 14, 16 has a roller 52 positioned at the top of, and approximately in the center of, the mud flap. For mud flap 14 in FIG. 4, cable 28 extends directly from the head bracket 46 around roller 52 to the connector 32 on the mud flap 14. The cable length is sized and the positioning of the piston 44 is set such that the cable 28 remains under tension when the mud flap 14 is fully extended in a vertical position. In order to simultaneously lift mud flaps 14, 16 with the actuation of a single power cylinder 42, one or more additional rollers 52 can be used. For mud flap 16, cable 30 extends from the head bracket 46 around two rollers 52 and then through the base 24 at aperture 26 to connector 32. The cable 30 is also maintained in tension when the mud flap 16 is in the extended position.

In operation, the cylinder 42 is initially positioned with the piston 44 extended such that the mud flaps are fully extended. If power to the cylinder 42 is turned off, the weight of the mud flaps will provide sufficient tension through cables 28, 30 to maintain the mud flaps 14, 16 in full extension. When the pneumatic power supply or hydraulic power supply is operational and the driver is ready to operate the vehicle in reverse, the driver can operate the control switch in the cab of the vehicle to retract the piston 44 of the cylinder 42. As the piston 44 is retracted, the cables 28, 30 raise the mud flaps 14, 16 such that the mud flaps 14, 16 will not be pulled under tires 18 and ripped away from the bracket 20.

When the driver has completed the backing up of the vehicle, the control switch in the cab can be operated to extend the piston 44 and lower the mud flaps 14, 16.

The mud flap lifting device 54 shown in FIGS. 6–9 for lifting mud flaps 14, 16 includes additional features and a different configuration than the lifting device 10 in FIGS. 2–5. The lifting device 54 has an L-shaped bracket 56 (FIG. 8) with a side plate 58 for mounting purposes and a base 60 for supporting the cylinder 62 and other components. A cover (not shown) is installed over the bracket to enclose the lifting device 54. The cover can be removed to inspect and service the components mounted on the base 60. A number of alternative housing 56 configurations and mounting hardware can be used to support the device on the bracket 20 or other structural components of the vehicle 12.

The cable 64 in the lifting device 54 is a single piece of cable with one end 66 attached to a mud flap 14 and the other end 68 attached to the other mud flap 16 by fasteners 32. The cable 64 is threaded through a bracket 70 at the head of piston 72 on cylinder 62. A retainer 74 is used to secure the cable 64 to the bracket 70.

The mud flap lifting device 54 also includes three rollers 76 to facilitate the movement of the cable 64 and the lifting of the mud flaps 14, 16. The rollers 76 at the top of the mud flaps are mounted on a roller base 78 which can be adjusted to different widths. Since the spacing between the mud flaps 14, 16 varies for different vehicles, the base 60 includes a plurality of mounting holes 80 so that the roller 76 on roller base 78 can be positioned in the desired location in the approximate center of the mud flap. The base 60 also include cable apertures 82 for directing the cable to the connector 32 on the mud flaps.

The piston 72 and rollers 76 in the lifting device are configured such that the piston 72 is retracted when the mud flaps 14, 16 are fully extended. The power hoses for providing power to the cylinder 62 and the cab mounted control switch for operating the cylinder 62 in lifting device 54 are not shown in FIGS. 6–9, but would be similar to such features described above. When the control switch is activated to extend the piston 72, the ends 66, 68 of the cable 64 are drawn upward to lift the mud flaps 14, 16.

The lifting device 54 may include two hoses for controlled movement of the piston 72 in both directions. Power is applied to the cylinder 62 in one direction to move the piston and raise the mud flaps, and is applied in the opposite direction to move the piston to lower the mud flaps. The lifting device may also use only a single hose to supply power. Power is applied only in a single direction for extending the piston 72 of cylinder 62 to lift the mud flaps 14, 16. Once the mud flaps 14, 16 have been lifted and the vehicle is no longer moving in a reverse direction, the power is turned off and the pressure in the cylinder 62 is released. The gravitational force on the mud flap causes the mud flap to return to a fully extended position. The ends 66, 68 of the cable 64 are pulled in a downward direction, which causes the piston 72 to retract into the cylinder 62 without the aid of power from the power source being supplied to the cylinder 62.

The piston 72 is fully retracted when the flaps 14, 16 are extended, which is how the mud flaps are positioned for normal travel on a road or highway. Since the vehicle will have a tendency to bounce and vibrate as the vehicle is moving at highway speed, less strain and wear is placed on the seals and mounting of the cylinder 62 when the piston 72 is retracted. The piston 72 is only in the extend position for a short period of time when the vehicle is backing up and the mud flaps are raised.

Three cable guides 80 are provided to keep the cable 64 clean and to ensure smooth movement of the cable 64 about the cylinder 62 and the piston 72. The cable guides 80 may be formed from tubular steel or black iron pipe. Other types of cable guides or retention systems may be used to achieve the desired spacing. If the cable guides 80 are not provided, the cable 64 has a tendency to bind about the cylinder 62 or to catch on the bracket 70 at the end of the piston 72. FIG. 8 shows the general position of the cable guides about the cylinder 62. Guide supports 82 are used to support the cable guides 80. A cylinder support is also shown for mounting the cylinder 62 on the base 60.

Figure 10:
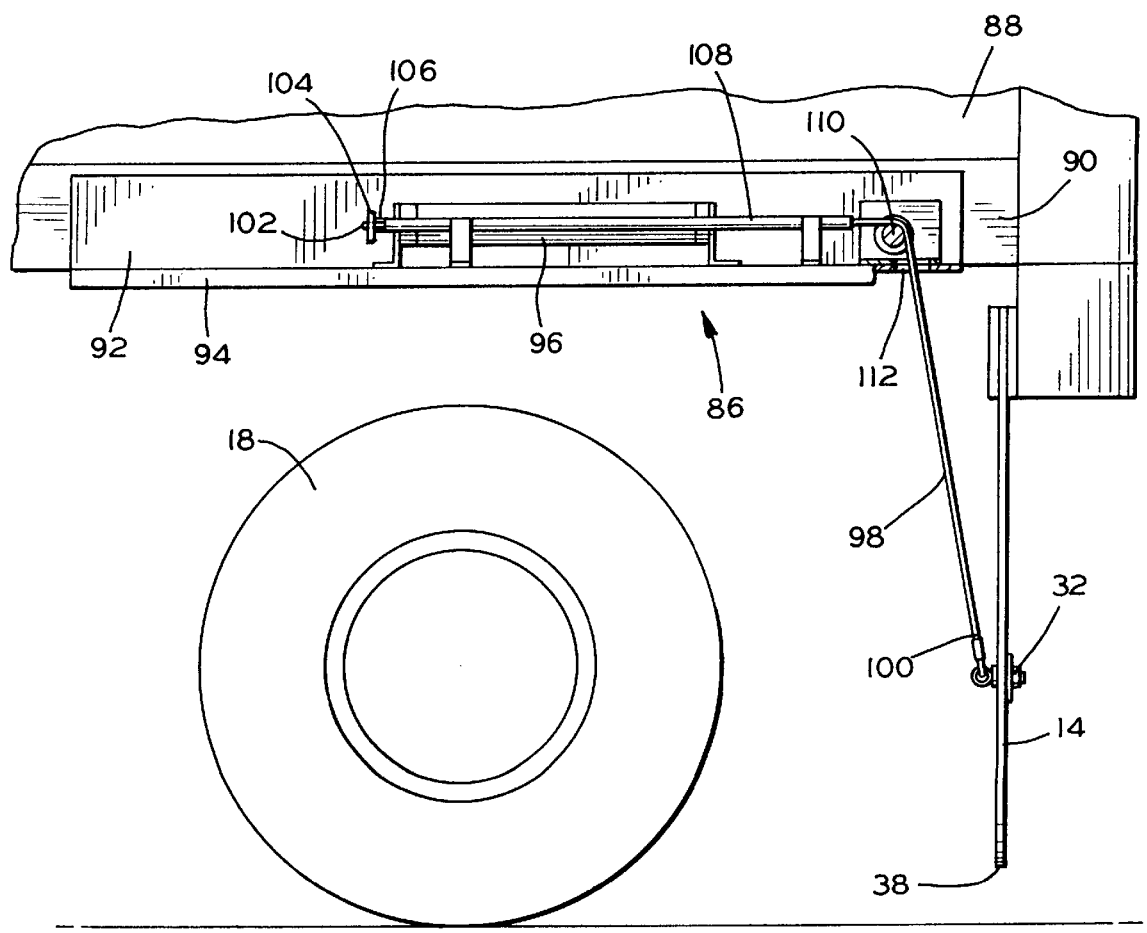
FIG. 10 is a third embodiment of the system with side mounting for use on a single mud flap.

In some vehicles, it is not possible to mount a "two-flap" unit across the back of the vehicle. The spacing may not be adequate to mount mud flap lifting devices 10, 54. In addition, structures or other implements mounted on the back of the vehicles may preclude the use of such a device. FIG. 10 shows an alternative embodiment for use as a "single flap" lifting device 86. The single flap lifting device 86 is mounted at the corner 90 of vehicle 88 and may be mounted horizontally along the side of the vehicle (FIG. 10), vertically at the corner of the vehicle in line with the mud flaps, or at any convenient angle where appropriate structure members on the vehicle are present to support the device.

The single flap lifting device 86 includes a side plate 92 and base 94. The power cylinder 96 is operated by the control switch as described above for lifting the mud flap 14. The single cable 98 has one end 100 secured by eye bolt connector 32 at mud flap 14 and the other end secured in bracket 104 mounted on piston 106. A cable guide 108 is used to direct the cable 98 to the roller 110 and through aperture 112. When the piston 106 is extended, the cable 98 lifts the mud flap 14 to a folded, raised position. An identical device 86 would typically be mounted on the opposite side of the vehicle for lifting the other mud flap 16. Separate power hoses would be connect to each unit, and both devices 86 could be controlled by a single control switch in the cab of the vehicle.

Figure 15:
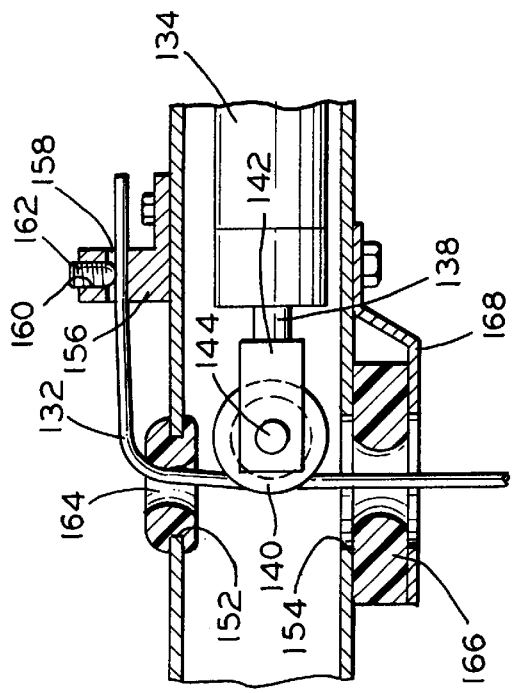
FIG. 15 is an enlarged portion of the device as shown in FIG. 14.
Figure 13:
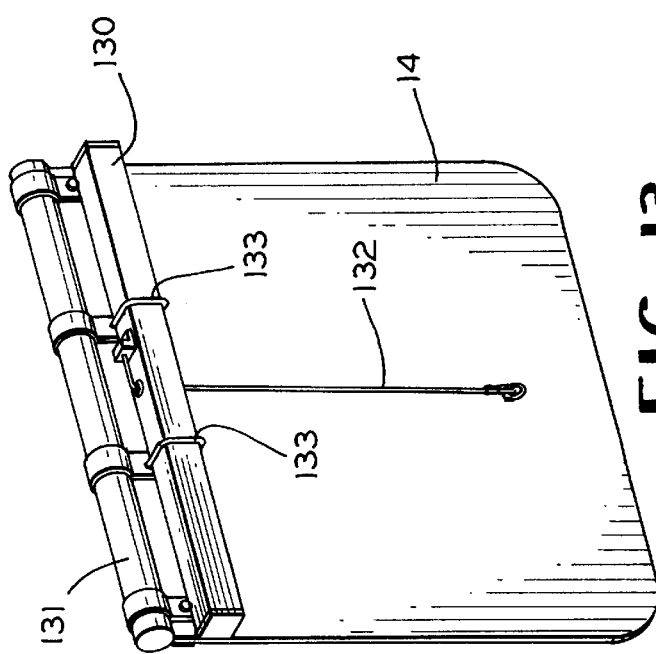
FIG. 13 is a perspective view of an alternate embodiment of the mud flap lifting device of the invention mounted on a vehicle.
Figure 14:
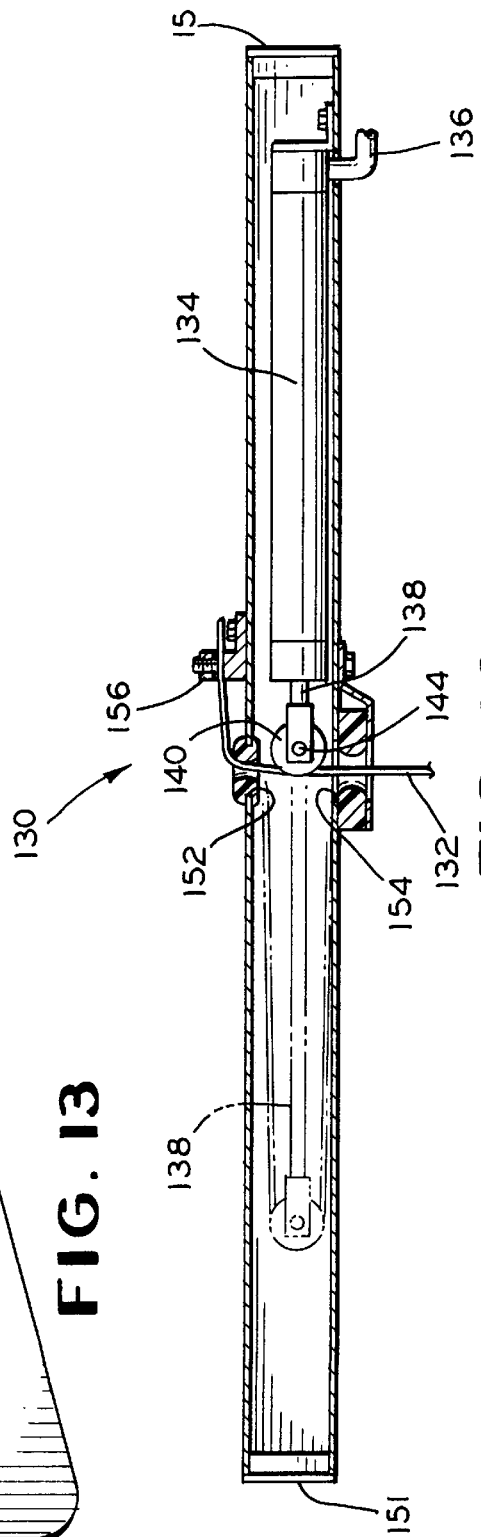
FIG. 14 is a front sectional view of the mud flap lifting device of FIG. 13.

A further, most preferred embodiment of the invention is illustrated in FIGS. 13 to 15. The device of this embodiment, denoted by the reference numeral 130, is generally intended for use as a "single flap" lifting device. The mud flap lifting device 130 is mounted at the corner of the vehicle and may be mounted horizontally along the back of the vehicle in a manner similar to that shown in FIG. 1 for the mounting device 10, or at any convenient position where appropriate structure members on the vehicle are present to support the device. Preferably, the device 130 is mounted to the same mounting bracket 131 used to mount the mud flap 14, as shown in FIG. 13. Any suitable means, such as the U-bolts 133 shown in FIG. 13, can be used to secure the device 130 to the vehicle.

The mud flap lifting device 130 includes a cable 132 having a first end fixedly secured relative to a vehicle and a second end fixedly secured to a mud flap 14 mounted on the vehicle in spaced apart relationship to a top edge of the mud flap, as described above for the other embodiments of the invention. A power cylinder 134 is mounted on the vehicle in proximity to an upper edge of the mud flap. The power cylinder could be a pneumatic cylinder, a hydraulic cylinder, an electrical solenoid, or other similar power device. The power cylinder 134 will typically be a pneumatic or a hydraulic cylinder. In that case, at least one power hose 136 connects the cylinder 134 to a pneumatic or hydraulic power supply on the vehicle. Control of the power cylinder 134 may be effected as with the other embodiments of the invention.

The power cylinder 134 includes an extendable piston 138 for engaging the cable 132 at a location intermediate the first and second ends thereof. In this regard, the piston 138 may be provided with a roller 140 or similar low friction device mounted to the piston by a head bracket 142 and pin 144 or like structure.

Because of the dirty, outdoor environment encountered by the mud flap lifting device 130, a cover or housing 150 is provided to enclose the power cylinder 134 and a portion of the cable 132. The cover 150 is an elongate enclosure which provides adequate space for actuation of the power cylinder 134. In a preferred embodiment, the cover 150 is provided with removable end caps 151 which provide access to the interior thereof.

The cover 150 is provided with first and second apertures 152 and 154 for positioning of the cable 132. In a preferred embodiment, an attachment bracket 156 is mounted on the cover 150 to fixedly secure the first end of the cable 132. The attachment bracket 156 is provided with a bore 158 for receiving the end of the cable 132 and a threaded aperture 160 perpendicularly intersecting with the bore 158. A set screw 162 is introduced in the threaded aperture 160 and is forced against the cable 132, thereby fixedly securing the cable 132 to the cover 150.

As best illustrated in FIG. 15, the opposite of the cable is introduced into the cover 150 through the first aperture 152. Preferably, a polymeric grommet 164 or the like is mounted about the first aperture 152 to protect the cable 132. The cable 132 extends past the roller 140 and passes out of the cover 150 through the second aperture 154. An annular cable guide 166 is preferably mounted about the second aperture 154 by means of a mounting bracket 168. The cable guide 166 is preferably formed of a low friction polymeric material and serves to protect the cable from wear during operation of the device.

In operation, the cylinder 134 is initially positioned with the piston 138 retracted, as shown in the solid lines in FIG. 14, such that the mud flap is fully extended. If power to the cylinder 134 is turned off, the weight of the mud flap will provide sufficient tension through the cables 132 to maintain the mud flap in the fully extended position. When the power supply is operational and the driver is ready to operate the vehicle in reverse, the driver can operate the control switch in the cab of the vehicle to extend the piston 138 of the cylinder 134. As the piston 134 is extended, the roller 140 or other contacting structure engages the cable 132, forcing the cable in a direction generally transverse to its longitudinal axis, or to the left as shown by the dotted lines in FIG. 14. As the first end of the cable 132 is fixedly secured to the cover 150, such movement causes the cable 132 to be raised up through the second aperture 154 in the cover 150, which in turn raises the lower edge of the mud flap 14.

Thus, as illustrated in FIG. 14, the apertures 152 and 154 are positioned near the middle of the length of the cover 150, so that there is sufficient clearance for the full extension of the piston 138. In another version of this embodiment (not shown), the cable 132 is fed on the opposite side of the roller 140, passing between the roller 140 and the end of the piston 138. With this construction, the cylinder 134 would be initially positioned with the piston 138 extended and the apertures 152 and 154 would be formed near the end of the cover 150 opposite the cylinder 134, such that the mud flap is fully extended. In addition, a second power hose (not shown) would be connected to the cylinder 134 opposite the hose 136, to permit the operator to force the piston 138 to its retracted position and thereby raise the mud flap.

In any of the configurations described above, the mud flap lifting devices may be positioned on either side of the mud flaps 14, 16. If the cable is connected on the inner surface (facing the tires 18) of the mud flap, the cable will be operated for an inward fold of the mud flap. If the cable is connected on the outer surface of the mud flap (opposite the tires 18), the cable will be operated for an outward fold of the mud flap. Operation in either direction is acceptable. On the inward fold, there is always sufficient spacing between the tire 18 and the mud flap 14 to permit the lifting of the lower edge 38 past the tire 18 such that the mud flap will not be pulled under the tire 18 during reverse movement of the vehicle.

Figure 11:
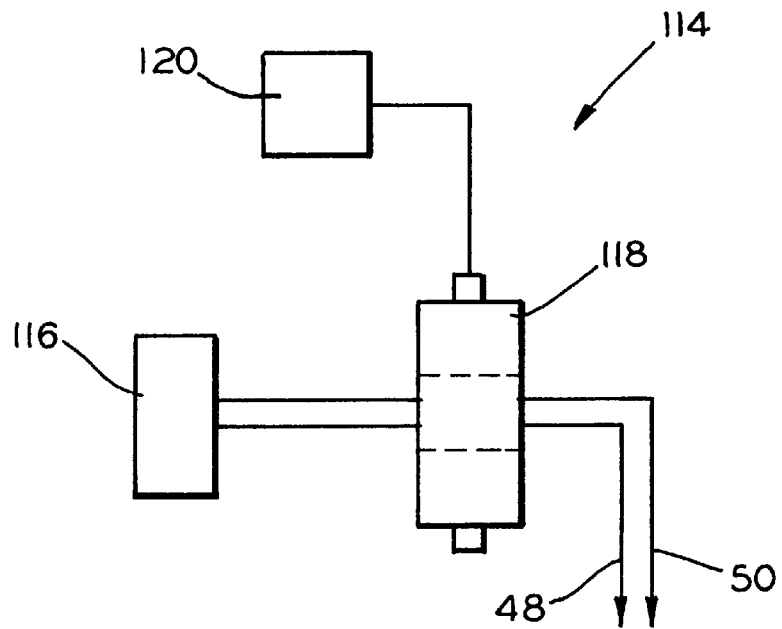
FIG. 11 is a schematic of a solenoid switch for controlling the power to the lifting device.

Different control switches are available for use in controlling the delivery of power from the power source on the vehicle to the cylinder. For pneumatic or hydraulic systems, a toggle operated, three position solenoid switch is an acceptable control switch. FIG. 11 shows a control switch 114 for delivering power from the power source 116 through hoses 48, 50 to the cylinder. The three position solenoid 118 is controlled by the three position toggle switch 120, which can be mounted at a convenient location in the cab of the vehicle. The solenoid 118 has an off position in the center, one side position for powering the cylinder to raise the mud flaps, and a side position for powering the cylinder to lower the mud flaps.

Figure 12:
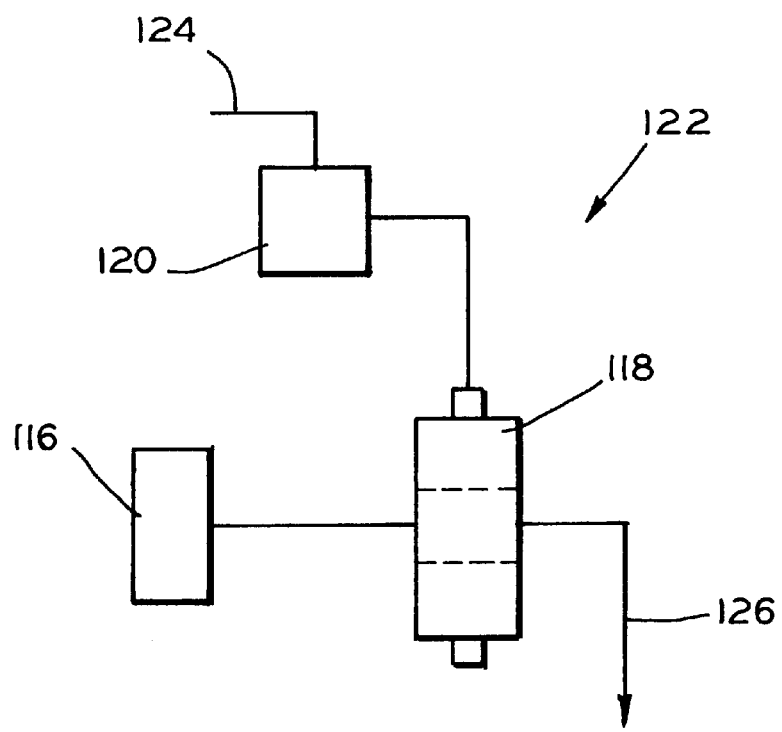
FIG. 12 is a schematic of an alternative control switch configuration for the lifting device.

The control switch 122 in FIG. 12 provides an alternative control system. The solenoid 118 and toggle switch 120 control the delivery of power through a single hose 126. The three toggle positions in this configuration are off (center), manual up (side), and automatic up (side). In the center off position, the mud flaps are fully extended. In the manual up position, the mud flaps are raised as power is supplied through hose 126 to move the piston in the cylinder. The flaps will stay in a raised position for as long as the toggle switch 120 and solenoid 118 are maintained in such side position. When the mud flaps are to be lowered, the toggle switch 120 and solenoid 118 are returned to the center off position and gravitational force will lower the mud flaps as described above. A sensor 124 is connected between the toggle switch 120 and the transmission to detect when the transmission is in reverse (similar to back up lights in an automobile). When the toggle switch 120 is in the automatic position, the solenoid will 118 will supply power only when the sensor 124 signals that the transmission is in reverse. Otherwise, the power will be off. By leaving the toggle switch 120 in the automatic position, the mud flaps will be raised every time the vehicle is placed in reverse and will be lowered (by gravitational force) every time the vehicle is taken out of reverse. Other control switch configurations can be supplied to meet the specific needs of the vehicle operator.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A mud flap system for attachment to a vehicle body comprising:

a) at least one mud flap having an upper edge secured to a mounting member;

b) an elongated housing positioned proximate said mounting member and extending parallel with the upper edge of said mud flap, said elongated housing defining a fixed length and being provided with vertically opposed upper and lower apertures proximate the middle of said length;

c) one or more attachment members for fixedly securing said elongated housing and said mounting member to said vehicle body;

d) a power cylinder mounted on said housing, said power cylinder including a piston having a piston rod with a roller mounted at an outer end thereof, the piston rod with the roller being movable between a retracted position within the elongated housing and an extended position within the elongated housing, wherein when the piston rod is in the retracted position the roller is proximate the upper and lower apertures in said housing;

e) a power supply and a control switch mounted on said vehicle body and spaced apart from said elongated housing;

f) at least one power lead connected between said power supply and said power cylinder for selectively delivering power from said power supply and said power cylinder in response to activation of said control switch to control the movement of the piston rod; and g) a cable extending through said upper and lower apertures, said cable having a first end fixedly secured to said elongated housing and a second end fixedly secured to a lower portion of said mud flap, the roller mounted to said piston rod being in rolling contact with a portion of the cable within said elongated housing extending between said upper and lower apertures;

whereby when the piston rod is moved from the retracted position to the extended position, the roller mounted at the outer end of the piston rod forces the portion of the cable extending between the upper and lower apertures in a direction extending away from said upper and lower apertures, thereby drawing the cable up into the elongated housing through the lower aperture and raising the lower portion of the mud flap relative to the upper edge of the mud flap.

2. The mud flap lifting device defined in claim 1, wherein said power cylinder is a pneumatic cylinder.

3. The mud flap lifting device defined in claim 1, wherein said power cylinder is a hydraulic cylinder.

4. The mud flap lifting device defined in claim 1, further comprising a non-abrasive annular cable guide secured to the housing about the lower aperture.

5. The mud flap lifting device defined in claim 4, wherein said cable guide is formed of a polymeric material.

6. The mud flap lifting device defined in claim 1, wherein said housing is formed from tubular metal.

7. The mud flap lifting system defined in claim 1, including a sensor for sensing a reverse movement by the vehicle body, said sensor being connected to said control switch so as to automatically raise the mud flap when reverse movement of the vehicle body is sensed by the sensor.

* * * * *